US007923873B2

(12) United States Patent
Tahara et al.

(10) Patent No.: US 7,923,873 B2
(45) Date of Patent: Apr. 12, 2011

(54) ELECTROMAGNETIC ACTUATOR

(75) Inventors: Toshihiro Tahara, Miyagi (JP);
Hirozumi Kon, Miyagi (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 12/699,612

(22) Filed: Feb. 3, 2010

(65) Prior Publication Data

US 2010/0133926 A1    Jun. 3, 2010

Related U.S. Application Data

(62) Division of application No. 12/054,031, filed on Mar. 24, 2008, now Pat. No. 7,679,228, which is a division of application No. 11/085,607, filed on Mar. 22, 2005, now Pat. No. 7,348,694.

(30) Foreign Application Priority Data

Mar. 23, 2004  (JP) ................. 2004-085363

(51) Int. Cl.
*H02K 7/02* (2006.01)
(52) U.S. Cl. ............................... 310/71; 310/43
(58) Field of Classification Search .............. 310/71, 310/14, 30, 43

See application file for complete search history.

(56) References Cited

U.S. PATENT DOCUMENTS

| 4,242,606 A | 12/1980 | Nonnenmann |
| 4,552,417 A | 11/1985 | Yamashita et al. |
| 5,344,129 A | 9/1994 | Ide et al. |
| 5,494,255 A * | 2/1996 | Pearson et al. ............ 251/129.15 |
| 5,739,599 A | 4/1998 | Murai |
| 5,828,144 A | 10/1998 | Murai |
| 5,905,317 A | 5/1999 | Aoki |
| 6,242,831 B1 | 6/2001 | Khan |
| 6,254,069 B1 | 7/2001 | Muramatsu et al. |
| 6,631,895 B2 | 6/2002 | Nemoto |
| 6,422,546 B1 | 7/2002 | Nemoto |
| 6,641,120 B2 | 2/2003 | Nemoto |
| 6,822,356 B2 | 8/2003 | Suzuki et al. |
| 7,066,454 B2 | 1/2005 | Kon et al. |
| 6,972,500 B2 * | 12/2005 | Kon et al. ................ 310/14 |
| 6,994,332 B2 | 2/2006 | Goto et al. |
| 7,157,821 B2 | 2/2006 | Kon et al. |

FOREIGN PATENT DOCUMENTS

| JP | 58-34582 | 8/1981 |
| JP | 56-162613 | 12/1981 |
| JP | 6-66288 | 9/1994 |
| JP | 09-049541 | 2/1997 |
| JP | 2001-01765 | 1/2001 |
| JP | 2002-199688 | 7/2002 |
| JP | 2002-272080 | 9/2002 |
| JP | 2003-021189 A | 1/2003 |
| JP | 2003-049894 A | 2/2003 |

* cited by examiner

*Primary Examiner* — Dang D Le
(74) *Attorney, Agent, or Firm* — Arent Fox LLP

(57) ABSTRACT

In an electromagnetic actuator including a bearing member which slidably supports a variable core, a yoke for retaining a coil assembly by cooperation with a bottom wall of a housing is connected to the housing, and the bearing member is fitted into the yoke. A support for supporting an outward-facing flange formed at one end of the bearing member is mounted on the bottom wall, and a set spring for biasing the outward-facing flange toward the support is mounted under compression between the outward-facing flange and the first yoke. A low-friction material coating made of a fluorocarbon resin is formed on at least one of opposed sliding surfaces of the bearing member and a movable core. Thus, even if wear powder is generated between the set spring of the bearing member and a portion on which the set spring is pressed, the wear powder is prevented from entering inside the bearing member.

1 Claim, 9 Drawing Sheets

ELECTROMAGNETIC ACTUATOR

RELATED APPLICATION DATA

This application is a Divisional of U.S. patent application Ser. No. 12/054,031, filed Mar. 24, 2008, which is a Divisional of U.S. patent application Ser. No. 11/085,607 filed Mar. 22, 2005, now U.S. Pat. No. 7,348,694, issued Mar. 25, 2008, and claims the benefit of priority from Japanese patent application No. 2004-85363, filed on Mar. 23, 2004. The disclosures of the prior applications are hereby incorporated by reference in their entirety.

BACKGROUND OF THE INVENTION

1. Field of the Invention

The present invention relates to an improvement in an electromagnetic actuator comprising: a stationary core supported on a bottom wall of a housing made of a magnetic material; a movable core opposed to the stationary core with an air gap left therebetween to drive a movable member; a coil assembly constructed by winding a coil around a bobbin which is supported in the housing and surrounds the stationary and movable cores; and a tubular bearing member which is disposed inside the coil assembly and slidably supports the movable core on its inner peripheral surface.

2. Description of the Related Art Japanese Patent Application Laid-open No. 2001-1765 discloses a conventional electromagnetic actuator.

In the conventional electromagnetic actuator, the bearing member is formed into a bottomed cylindrical shape, and a set spring is mounted under compression between a bottom of the bearing member and the movable core so that the set spring retains the bottom of the bearing member on a support portion formed on the housing while being in abutment against the support portion.

The present inventors discovered that wear powder is generated between the set spring and a portion on which the set spring is pressed by slight movement of the set spring within the bearing member, and the wear powder may enter sliding portions of the bearing member and the movable core, to deteriorate the sliding of the movable core. The resilient force of the set spring is also applied to the movable core in a direction to draw it away from the stationary core, and hence an effective attraction force generated between the stationary and movable cores is reduced by an amount corresponding to the resilient force.

SUMMARY OF THE INVENTION

Accordingly, it is an object of the present invention to provide an electromagnetic actuator, wherein even if wear powder is generated between the set spring of the bearing member and a portion on which the set spring is pressed, it is possible to prevent the wear powder from entering inside the bearing member, and no loss is generated in an effective attraction force between the stationary and movable cores despite the resilient force of the set spring, thereby enhancing the output performance of the movable core.

In order to achieve the above-mentioned object, according to a first feature of the invention, there is provided an electromagnetic actuator comprising: a stationary core supported on a bottom wall of a housing made of a magnetic material; a movable core opposed to the stationary core with an air gap left therebetween to drive a movable member; a coil assembly constructed by winding a coil around a bobbin which is supported in the housing and surrounds the stationary and movable cores; and a tubular bearing member which is disposed inside the coil assembly and slidably supports the movable core, wherein a first yoke for retaining the coil assembly by cooperating with the bottom wall is connected to the housing; the bearing member is fitted into the first yoke; a support for supporting an outward-facing flange formed at one end of the bearing member is mounted on the bottom wall; a set spring for biasing the outward-facing flange toward the support is mounted under compression between the outward-facing flange and the first yoke; and a low-friction material coating made of a fluorocarbon resin is formed on at least one of opposed sliding surfaces of the bearing member and the movable core.

The first yoke corresponds to an upper yoke 35 in an embodiment of the present invention, which will be described hereinafter.

According to a second feature of the present invention, in addition to the first feature, the low-friction material coating is formed on both the opposed sliding surfaces of the bearing member and the movable core.

According to a third feature of the present invention, in addition to the first feature, the low-friction material coating is formed on entirety of inner and outer surfaces of the bearing member.

With the first feature of the present invention, the set spring of the bearing member is disposed on an outer periphery of the bearing member. Therefore, even if wear powder is generated between the set spring of the bearing member and the portion on which the set spring is pressed, it is possible to prevent the wear powder from entering inside the bearing member, thereby ensuring smooth sliding of the movable core.

In addition, the resilient force of the set spring is borne by the first yoke connected to the housing, and is not applied to the movable core. Therefore, it is possible to prevent a loss of an effective attraction force between the stationary and movable cores due to the resilient force of the set spring, thereby enhancing output performance of the movable core.

Further, the low-friction material coating made of fluorocarbon resin is formed on at least one of the opposed sliding surfaces of the bearing member and the movable core. Therefore, a good slidability can be provided to each of the bearing member and the movable core, and hence the operation of the movable core can be smoothened, thereby enhancing wear resistances of the bearing member and the movable core to accommodate an increase in output performance of the actuator.

With the second feature of the present invention, the low-friction material coating is formed on both the opposed sliding surfaces of the bearing member and the movable core. Therefore, it is possible to effectively suppress the wear of the low-friction material coating occurring during an initial stage of shakedown sliding between the bearing member and the movable core, to thereby further enhance their wear resistances.

With the third feature of the present invention, the low-friction material coating is formed on the entirety of the inner and outer surfaces of the bearing member. Therefore, it is possible to eliminate the need for masking the bearing member during the formation of the low-friction material coating, thereby providing simplification of the manufacturing process to contribute to a cost reduction. Moreover, the fitting of the bearing member to the inner peripheral surface of the first yoke can be smoothly conducted by virtue of the low-friction material coating formed also on the outer peripheral surface of the bearing member, thereby further contributing to an enhancement in assemblability.

The above and other objects, features and advantages of the invention will become apparent from the following description of the preferred embodiment taken in conjunction with the accompanying drawings.

DETAILED DESCRIPTION OF PREFERRED EMBODIMENT

The present invention will now be described by way of an embodiment with reference to the accompanying drawings.

Figure 1:
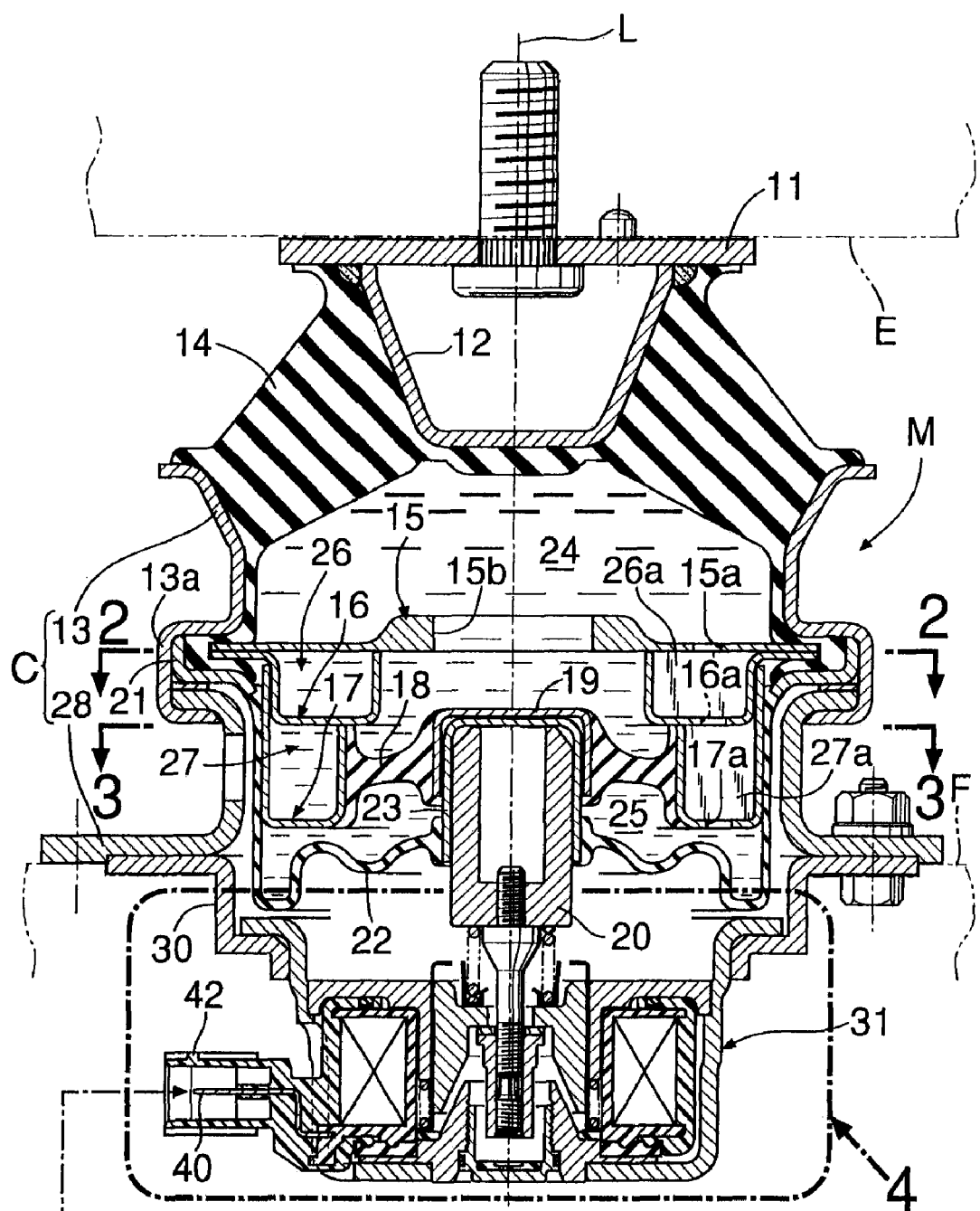
FIG. 1 is a vertical sectional view of an active vibration-isolating support system including an electromagnetic actuator according to the present invention.

Referring first to FIG. 1, an active vibration-isolating support system M having an electromagnetic actuator is interposed between an engine E and a vehicle body frame F in an automobile in order to resiliently support the engine E on the vehicle body frame F.

The active vibration-isolating support system M has a structure in which it is substantially symmetric with respect to an axis L. The support system M includes: a plate-shaped mounting bracket 11 coupled to the engine E; an inner tube 12 welded to the mounting bracket 11; an outer tube 13 disposed coaxially around an outer periphery of the inner tube 12; and a first thick elastic member 14 made of a thick rubber or the like and bonded by vulcanization to opposed conical faces of the inner tube 12 and the outer tube 13. Disposed below the first elastic member 14 are a first orifice-defining member 15, a second orifice-defining member 16 and a third orifice-defining member 17, which are arranged vertically and integral with one another.

The first orifice-defining member 15 is of a disk-shape, and has an opening 15b in its central portion. The second orifice-defining member 16 is of an annular shape having a tub-shaped section with its upper surface opened, and is integrally bonded to the first orifice-defining member 15, so that the opened upper surface is closed by the first orifice-defining member 15. The third orifice-defining member 17 is also of an annular shape having a tub-shaped section with its upper surface opened, and is integrally bonded to the second orifice-defining member 16, so that the opened upper surface is closed by the second orifice-defining member 16. Outer peripheries of the first and second orifice-defining members 15 and 16 are superposed integrally on each other, and fixed to an annular crimping fixation portion 13a connected to a lower portion of the outer tube 13.

An outer peripheral surface of a second annular elastic member 18 made of a rubber or the like is bonded by vulcanization to an inner peripheral surface of the third orifice-defining member 17. A first cap member 19 disposed on the axis L with its lower surface opened is bonded by vulcanization to an inner peripheral surface of the second elastic member 18. A second cap member 23 and a movable member 20 are sequentially secured to the first cap member 19 by press-fitting. The second cap member 23 has a lower end protruding downwards of the first cap member 19. One end of an inner periphery of a diaphragm 22 disposed below the second elastic member 18 is bonded by vulcanization to an outer peripheral surface of the protrusion. A ring member 21 is bonded by vulcanization to an outer periphery of the diaphragm 22, and fixed along with the outer peripheries of the first and second orifice-defining members 15 and 16 to the crimping fixation portion 13a. The movable member 20 is capable of vertically moving along with the first and second cap members 19 and 23 by flexing of the second elastic member 18 and the diaphragm 22.

Thus, a first liquid chamber 24 containing a liquid in a sealed manner is defined between the first elastic member 14 and the second elastic member 18. A second liquid chamber 25 containing a liquid likewise in a sealed manner is defined between the second elastic member 18 and the diaphragm 22. The first and second liquid chambers 24 and 25 are in communication with each other through an upper orifice 26 and a lower orifice 27, which are defined by the first, second and third orifice-defining members 15, 16 and 17.

Figure 2:
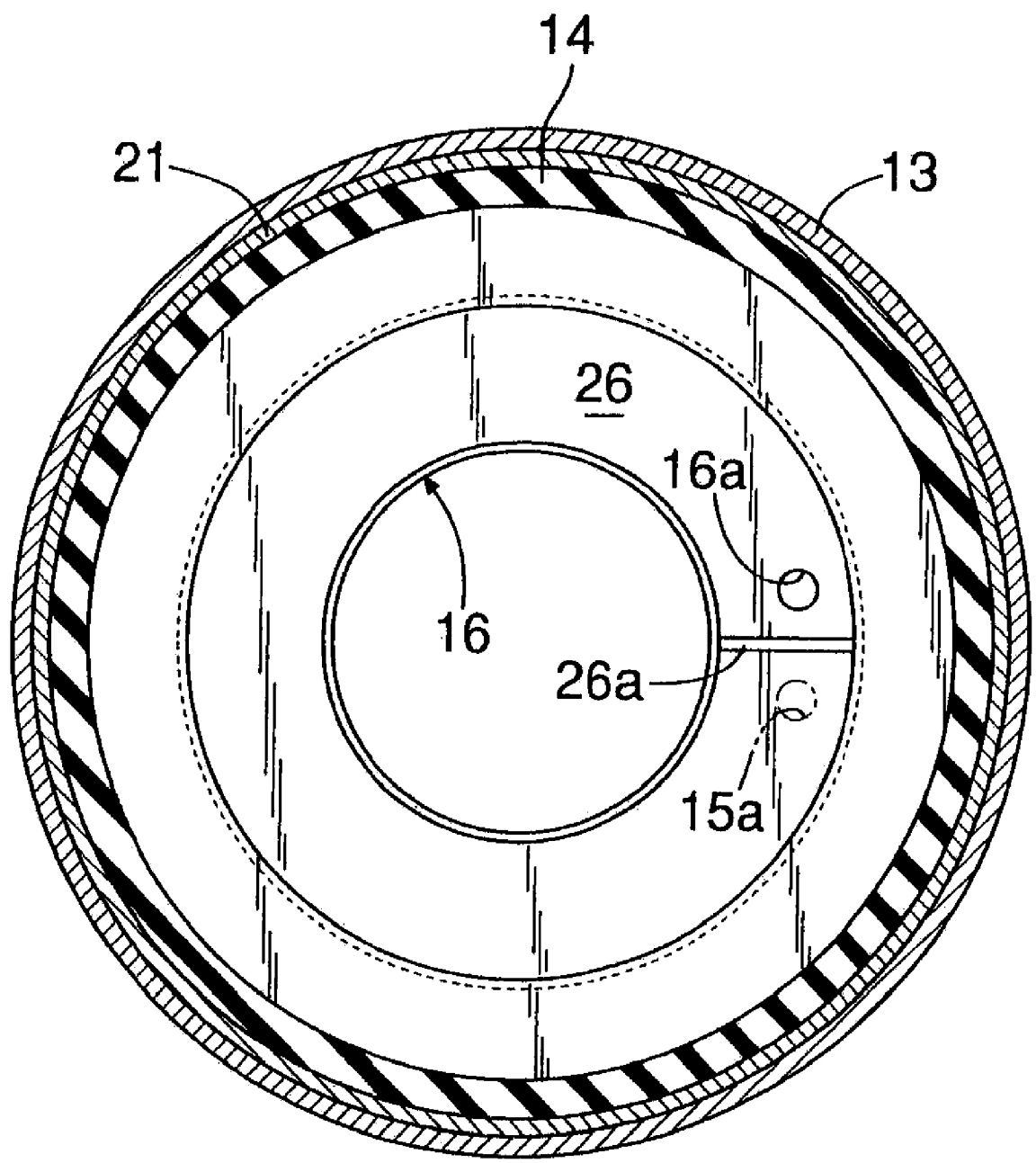
FIG. 2 is a sectional view taken along a line 2-2 in FIG. 1.

The upper orifice 26 is defined over a little less than one round between the first and second orifice-defining members 15 and 16 (see FIG. 2). A partition 26a constituting opposite end walls of the upper orifice 26 is welded between the first and second orifice-defining members 15 and 16. The upper orifice 26 is in communication with the first liquid chamber 24 through a through-hole 15a in the first orifice-defining member 15 on one side of the partition 26a, and with the lower orifice 27 through a through-hole 16a in the second orifice-defining member 16 on the other side of the partition 26a.

Figure 3:
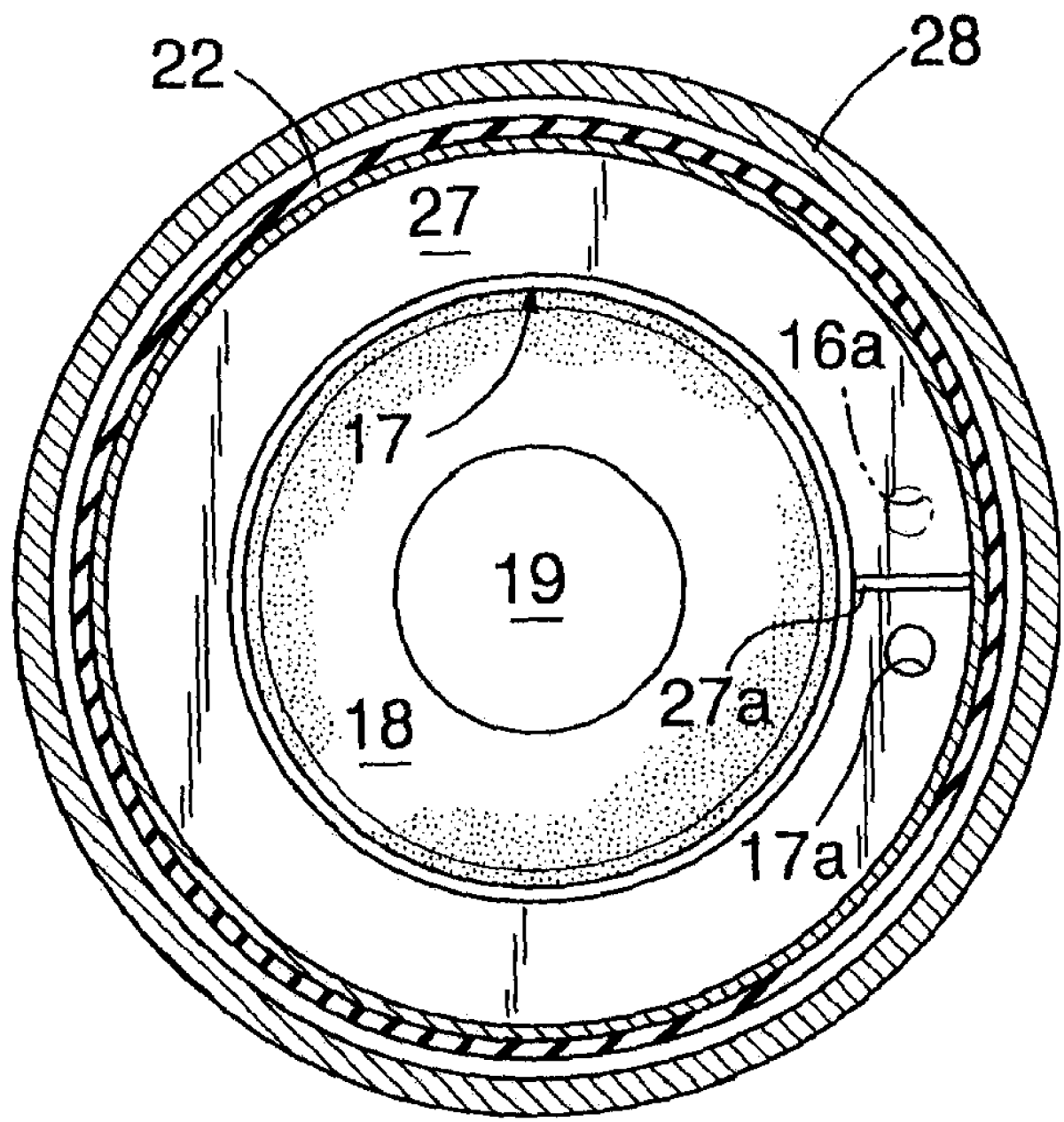
FIG. 3 is a sectional view taken along a line 3-3 in FIG. 1.

The lower orifice 27 is defined over a little less than one round between the second and third orifice-defining members 16 and 17 (see FIG. 3). A partition 27a constituting opposite end walls of the lower orifice 27 is welded between the first and second orifice-defining members 15 and 16. The lower orifice 27 is in communication with the upper orifice 26 through the through-hole 16a on one side of the partition 27a, and with the second liquid chamber 25 through a through-hole 17a in the third orifice-defining member 17 on the other side of the partition 27a. In this manner, the first and second liquid chambers 24 and 25 are in communication with each other through the upper and lower orifices 26 and 27 connected in series to each other.

A tubular bracket 28 is also fixed to the annular crimping fixation portion 13a. The active vibration-isolating support system M is mounted to a vehicle frame F by securing the tubular bracket 28 to the vehicle frame F. A support casing C of the active vibration-isolating support system M is constituted by the tubular bracket 28 and the outer tube 13.

An actuator-supporting member 30 is secured to the tubular bracket 28, and an electromagnetic actuator 31 for driving the movable member 20 is supported by the actuator-supporting member 30.

Figure 4:
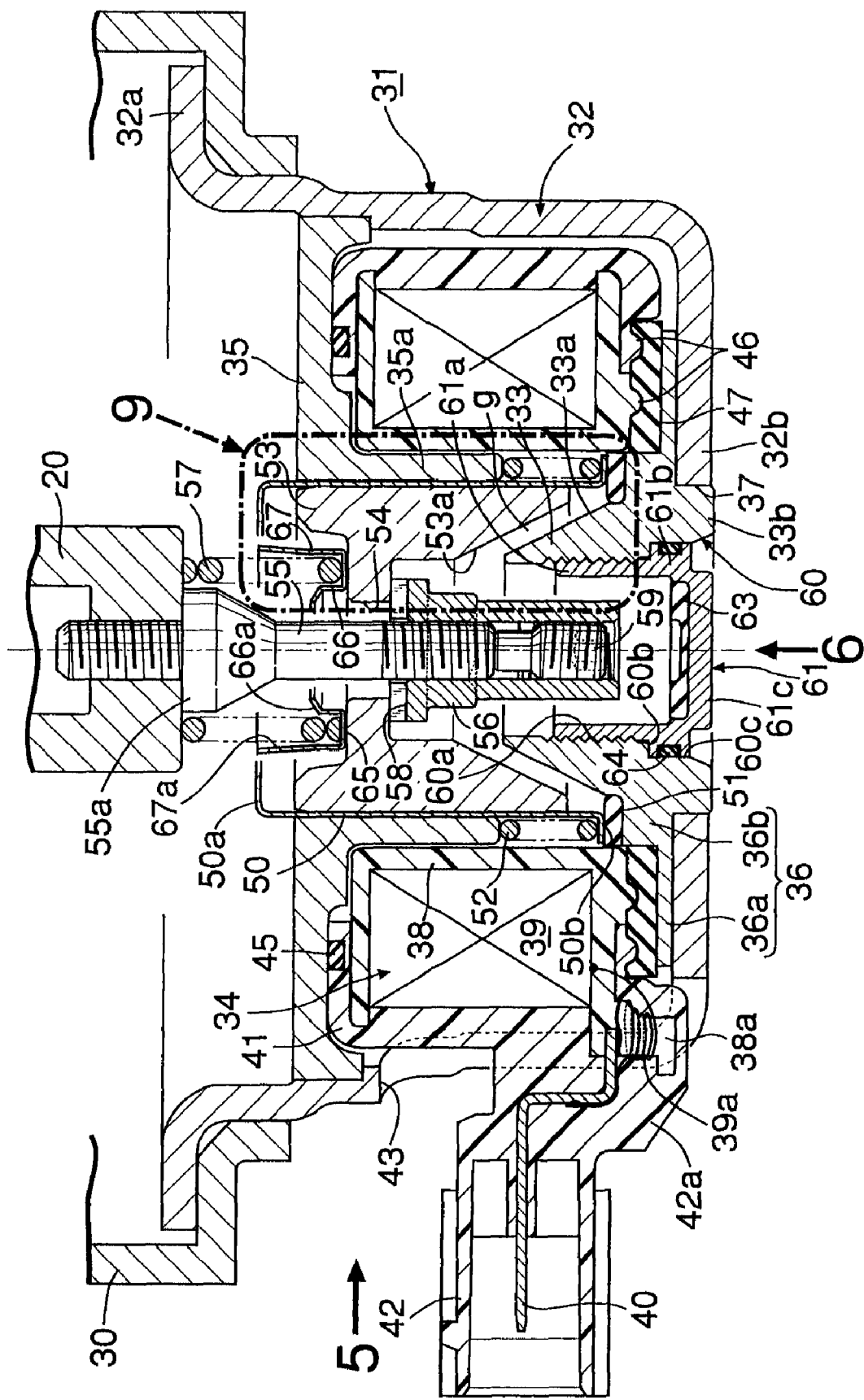
FIG. 4 is an enlarged view of a section 4 of FIG. 1.

Referring to FIG. 4, the actuator 31 includes a bottomed cylindrical housing 32 made of a magnetic material with its upper surface opened. A flange 32a formed at an upper end of the housing 32 is secured to the actuator-supporting member 30. The housing 32 is magnetic, and a stationary core 33, a coil assembly 34 and an upper yoke 35 are sequentially mounted within the housing 32. The stationary core 33 includes: an attraction face 33a at its upper portion; a positioning shaft 33b protruding from its lower surface; and a stepped collar-shaped lower yoke 36 formed around its outer periphery. The positioning shaft 33b is press-fitted into a positioning bore 37 in a bottom wall 32b of the housing 32 with the lower yoke 36 being in close contact with the bottom wall 32b of the housing 32. In this manner, the stationary core 33 is secured to the housing 32.

The coil assembly 34 includes a bobbin 38 made of a synthetic resin and disposed around an outer periphery of the stationary core 33, and a coil 39 wound around the bobbin 38. A small support pillar 38a is provided on an outer periphery of a lower flange of the bobbin 38 to protrude downwards. During formation of the small support pillar 38a, a base end of a coupler terminal 40 is insert-coupled to the small support pillar 38a. A lead wire 39a of the coil 39 is wound around the small support pillar 38a, and connected at its leading end to the coupler terminal 40 by soldering, electric welding or the like.

Figure 5:
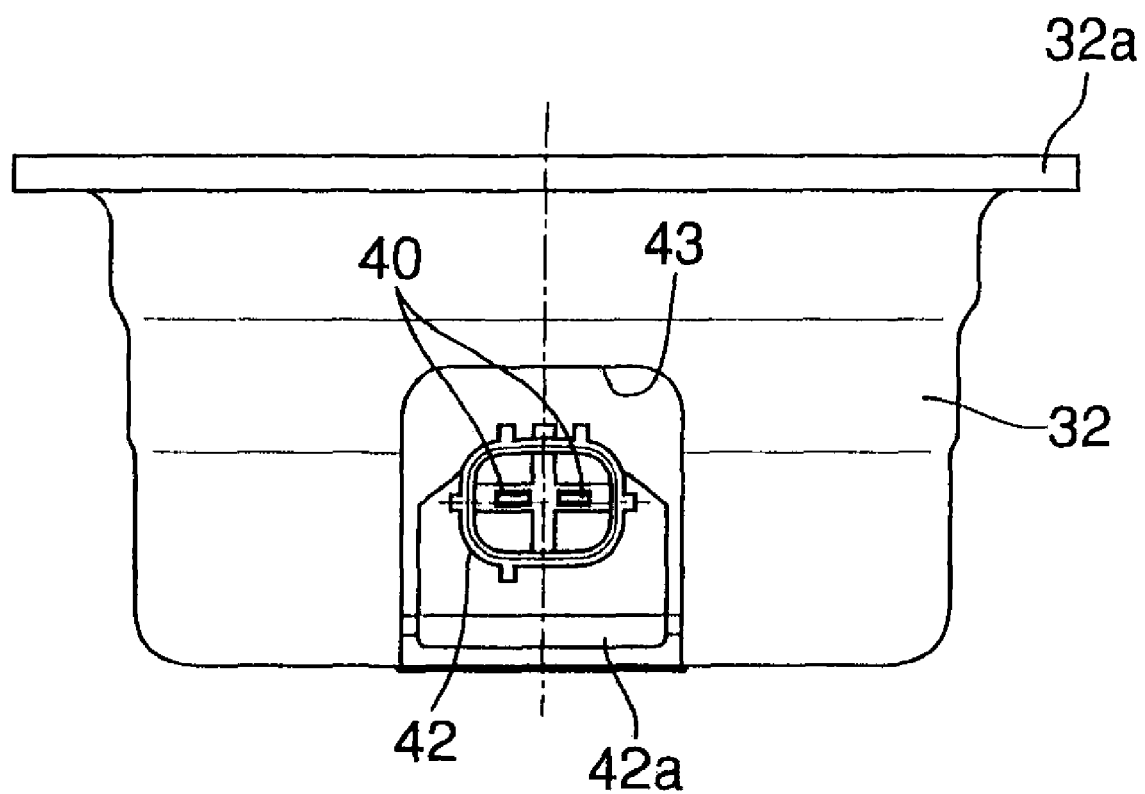
FIG. 5 is a view taken in a direction of an arrow 5 in FIG. 4.
Figure 6:
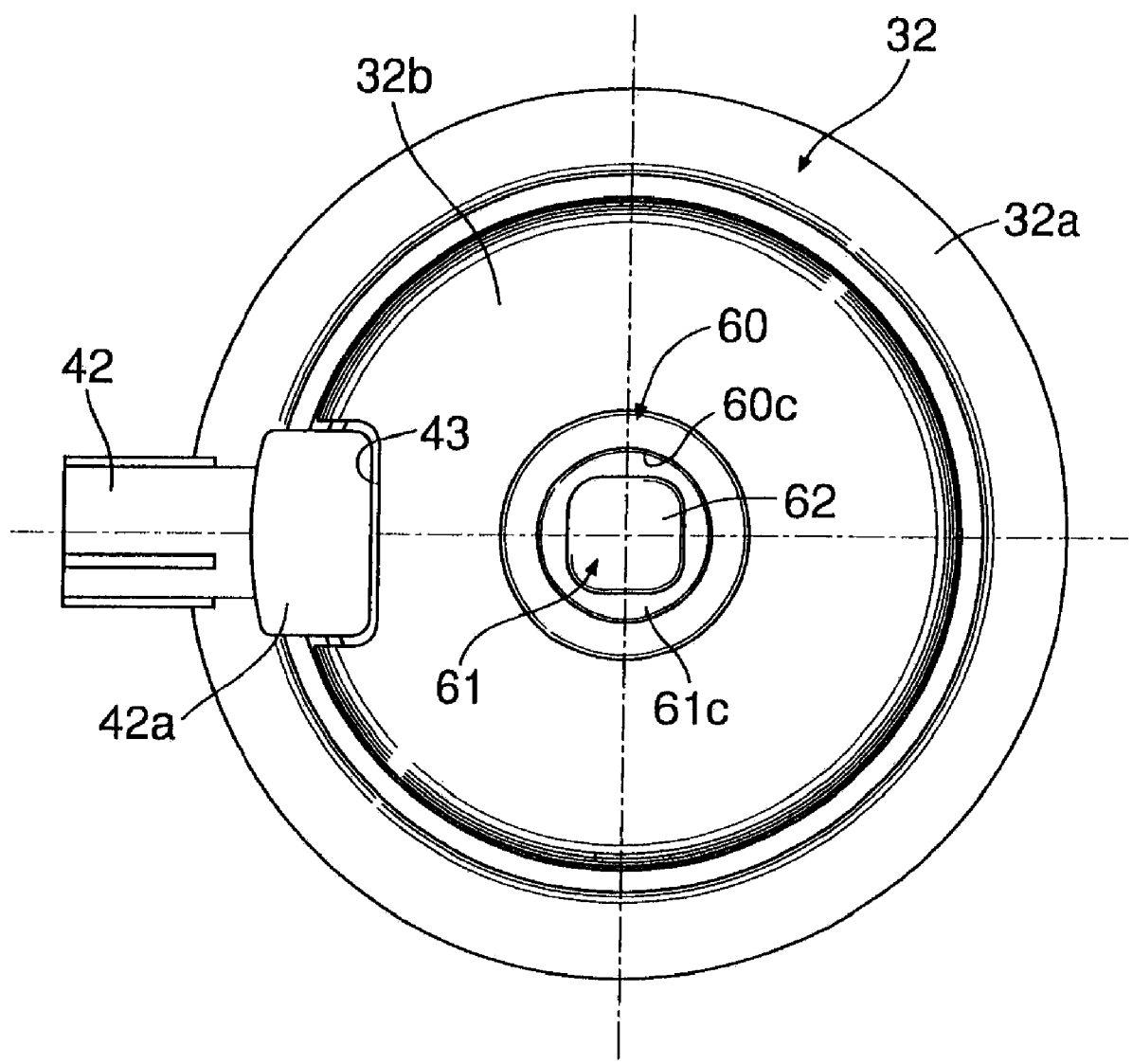
FIG. 6 is a view taken in a direction of an arrow 6 in FIG. 4.

After connection of the lead wire 39a to the coupler terminal 40, a cylindrical coil cover 41 is formed, by injection molding from a synthetic resin, to come into close contact with upper and lower opposite ends of the bobbin 38 as well as an outer peripheral surface of the coil 39 in order to fix the coil 39 to the bobbin 38 in a sealed manner. Formed integrally on the coil cover 41 at this time are a coupler 42 protruding radially outwards and retaining the coupler terminal 40, and a projection 42a protruding on a lower end face of the cover 41 to enclose the small support shaft 38a and the lead wire 39a. The coupler 42 is disposed so that it is exposed to the outside of the housing 32 through an opening 43 provided in a region from the bottom wall 32b to a peripheral wall of the housing 32 (see FIGS. 5 and 6). The projection 42a is disposed within the opening 43 to adjoin the bottom wall 32b of the housing 32.

An annular seal member 45 is mounted on an upper end face of the coil assembly 34, particularly, on an upper end face of the coil cover 41. A plurality of sealing projections 46 are integrally formed on a lower end face of the coil assembly 34, particularly, on lower end faces of the bobbin 38 and the coil cover 41, so that they are arranged concentrically to surround the stationary core 33. An elastic plate 47 is interposed between the lower end face of the coil assembly 34 and a thin outer periphery 36a of the lower yoke 36. The elastic plate 47 is formed of an elastic material such as NBR and a silicone rubber.

The upper yoke 35 is secured by press-fitting to an inner peripheral surface of the housing 32, to urge the coil assembly 34 toward the lower yoke 36 to retain it. This causes the seal member 41 and the elastic plate 47 to be compressed, whereby the coil assembly 34 is elastically supported without any looseness between the upper yoke 35 and the lower yoke 36, leading to enhancements in vibration resistance of the coil assembly 34 and in water-proof property of the coil 39. Particularly, the sealing projections 46 on the bobbin 38 and the coil cover 41 bite into an upper surface of the elastic plate 47 to more reliably ensure the sealing with the elastic plate 47. Therefore, in the case where rain water, wash water or the like entering the opening 43 from the outside is accumulated on the bottom of the housing 32, even if there is a defect in close contact between the coil cover 41 and the coil 39 as well as the bobbin 38, not only the flooding of water to the coil 39 but also the flooding of water to the inner periphery of the bobbin 38 can be reliably prevented.

A cylindrical bearing member 50 having a small wall thickness is slidably fitted to an inner peripheral surface of a cylindrical portion 35a of the upper yoke 35 disposed on an inner periphery of the bobbin 38. A flange 50a facing radially inwards is integrally formed at an upper end of the bearing member 50, and a flange 50b facing radially outwards is integrally formed at a lower end of the bearing member 50.

The flange 50b facing radially outwards is superposed on a thick inner peripheral portion 36b of the lower yoke 36 with an annular elastic plate 51 interposed therebetween. A set spring 52 comprising a coil spring is mounted under compression between the flange 50b facing radially outwards and the stationary core 33, whereby the bearing member 50 is retained elastically on the lower yoke 36 and thus provided with a vibration isolation property.

The elastic plate 51 also serves as a downward-movement stopper for a movable core 53, which is adapted to receive a lower end of the movable core 53 in a buffering manner to define a downward-movement limit for the movable core 53, thereby avoiding the collision of the movable core 53 and the stationary core 33 with each other during downward movement of the movable core 53 toward the stationary core 33.

The movable core 53 is slidably received in the bearing member 50, and has an attraction face 53a opposed to the attraction face 33a of the stationary core 33 with an air gap g left therebetween. A connecting bolt 55 passed loosely through a relatively large-diameter through-hole 54 opening into a central portion of the movable core 53 is threadedly fitted at its upper end into the movable member 20. An adjusting nut 56 is threadedly fitted over a lower end of the connecting bolt 55 to support a lower end face of the movable core 53 around the through-hole 54. In this case, a set spring 57 is mounted under compression between the movable member 20 and the movable core 53, to retain the movable core 53 at a location where it is supported by the adjusting nut 56. In this manner, the movable core 53 is clamped by both the set spring 57 and the adjusting nut 56 threadedly fitted over the connecting bolt 55 formed integrally with the movable member 20. A radial venting groove 58 is formed in an upper end face of the adjusting nut 56 pressed on the movable core 53 to communicate with the through-hole 54, so that the flowing of air is permitted smoothly between upper and lower spaces during upward movement of the movable core 53.

If a position where the adjusting nut 56 is threadedly fitted over the connecting bolt 55 is advanced or retracted, upper and lower positions of the movable core 53, i.e., the air gap g between the attraction faces 33a and 53a of the movable core 53 and the stationary core 33 can be adjusted. The adjusting position of the adjusting nut 56 is fixed by a locking screw 59 threadedly fitted from below and tightened into the adjusting nut 56.

Figure 7:
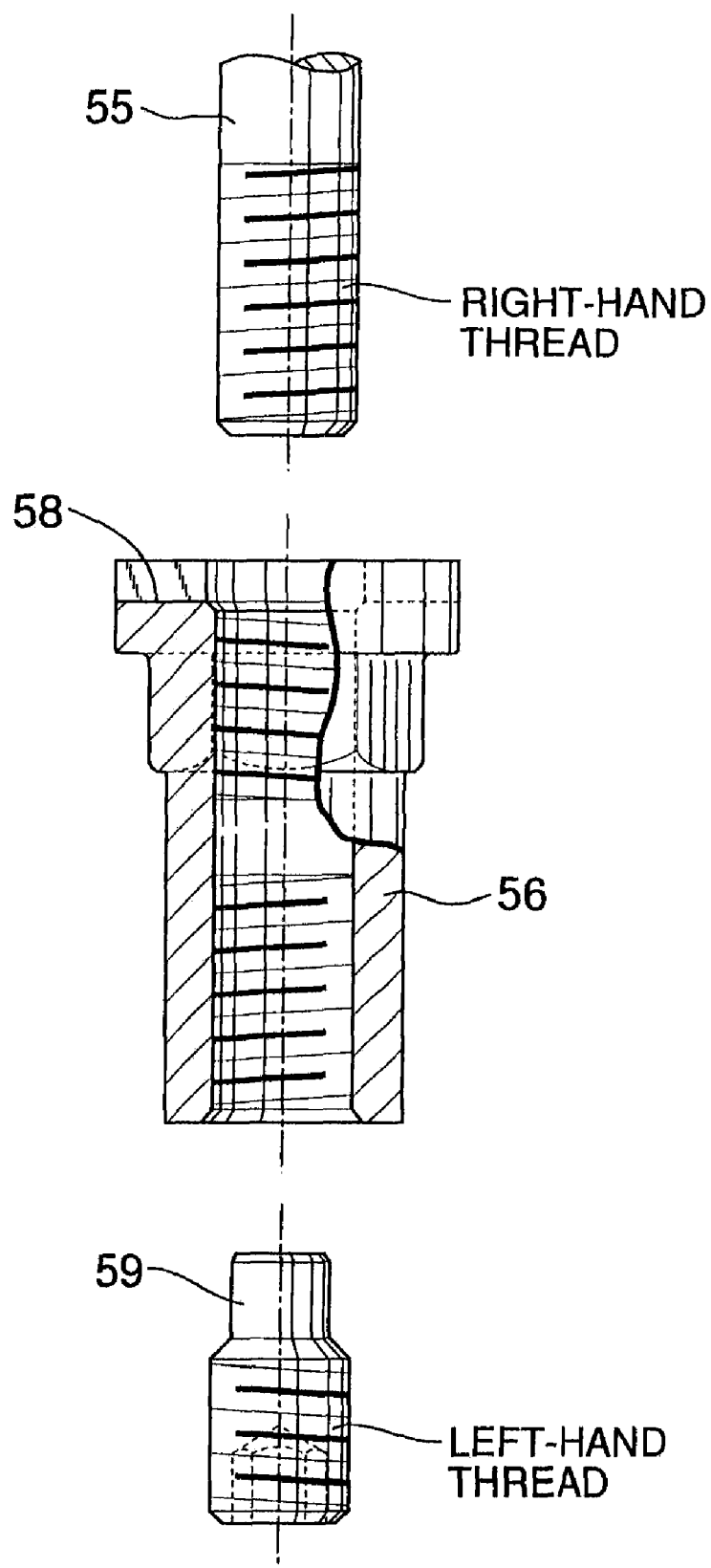
FIG. 7 is a perspective view of an adjusting nut in FIG. 4.
Figure 8:
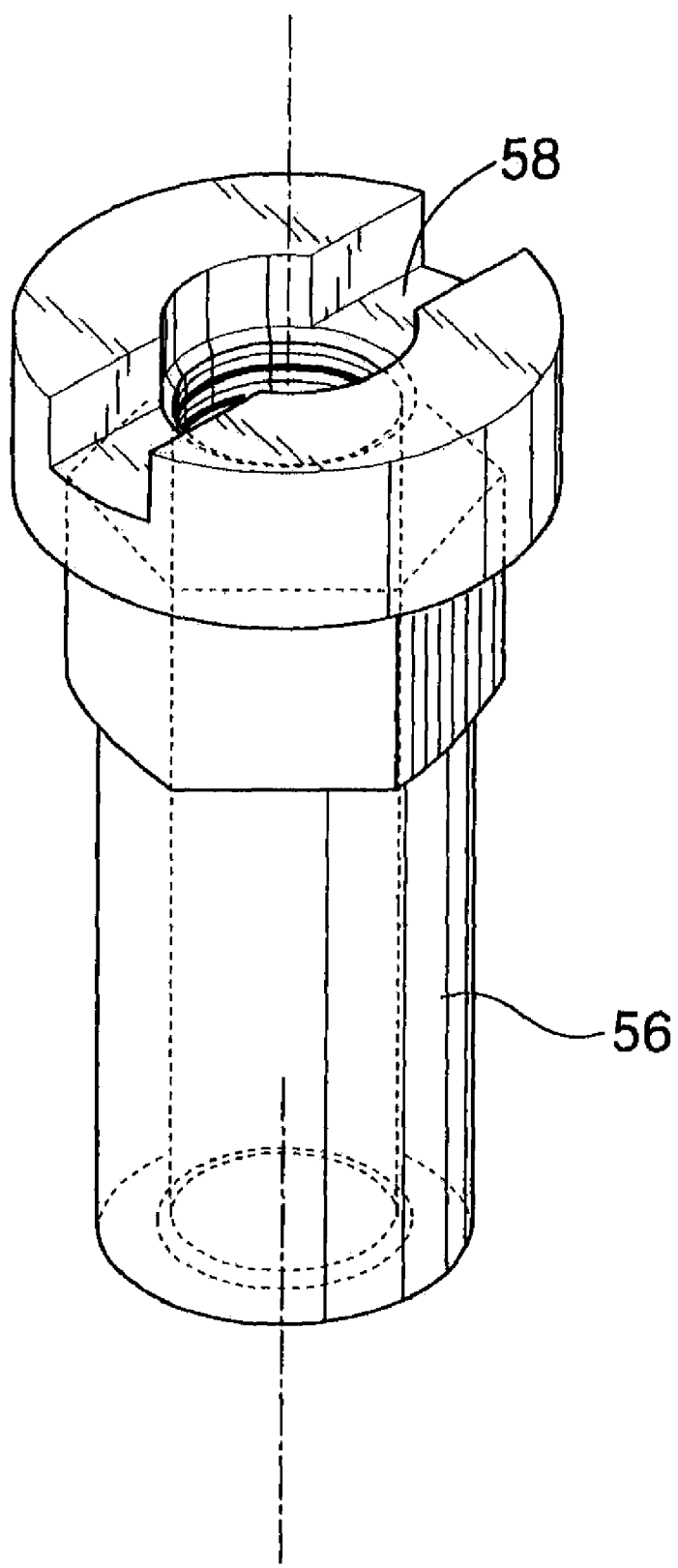
FIG. 8 is an exploded partially vertical sectional side view of the adjusting nut, a connecting bolt and a locking screw.

As shown in FIGS. 7 and 8, a thread of the connecting bolt 55 is a usual right-hand thread, while a thread of the locking screw 59 is a left-hand thread. Therefore, if, in a state in which the adjusting nut 56 has been retained in a predetermined adjusting position by a tool, the locking screw 59 is tightened by another tool, the torque of the locking screw 59 is transmitted by friction to the connecting bolt 55 to draw the connecting bolt 55 toward the locking screw 59. Therefore, the adjusting nut 56 can be locked reliably in the adjusting position.

An adjusting bore 60 for enabling the access of the adjusting nut 56 is provided in a central portion of the stationary core 33, so that the locking screw 59 and the adjusting nut 56 can be operated by a tool inserted into the adjusting bore 60. The adjusting bore 60 comprises a threaded bore portion 60a and a fitting bore portion 60c having a diameter larger than that of the threaded bore portion 60a and leading to a lower end of the threaded bore portion 60a through an annular shoulder 60b. On the other hand, a plug 61 for closing the adjusting bore 60 is of a bottomed cylindrical shape with its upper end opened, and has a threaded tube 61a threadedly fitted into the threaded bore portion 60a, while receiving the adjusting nut 56, a collar portion 61b fitted into the fitting bore 60c, and a bottom 61c. A seal member 64 is mounted to an outer periphery of the collar portion 61b to come into close contact with an inner peripheral surface of the fitting bore portion 60c. A polygonal tool-engagement projection 62 is formed on a lower surface of the bottom 61c.

Thus, by threadedly fitting and tightening the threaded tube 61 into the threaded bore portion 60a, until the collar portion 61b fitted in the fitting bore 60c abuts against the shoulder 60b, the adjusting bore 60 can be water-tightly closed by the plug 61.

An elastic plate 63 is bonded to an upper surface of the bottom 61c of the plug 61, so that the bottom 61c receives a lower end of the adjusting nut 56 through the elastic plate 63 in a buffering manner, thereby defining a downward movement limit for the movable member 20. The adjusting nut 56 abuts against the bottom 61c of the plug 61 when the movable member 20 is further moved downwards while compressing the set spring 57, after the movable core 53 has reached the downward movement limit by virtue of the downward movement of the movable member 20.

Both the opposed attraction faces 33a and 53a of the stationary core 33 and the movable core 53 within the bearing member 50 are formed into conical faces so as to define the conical tube-shaped air gap g between them, and disposed so that the attraction face 53a of the movable core 53 surrounds the attraction face 33a of the stationary core 33. Thus, a relatively large attracting force and a relatively long stroke of the movable core 53 can be obtained also in the stationary core 33 and the movable core 53 having relatively small diameters within the bearing member 50.

Moreover, the attraction face 53a of the movable core 53 is formed on the inner peripheral surface of the core 53, and hence a sufficient long support span by the bearing member 50 can be ensured irrespective of the attraction face 53a, thereby securing the stable upward and downward movements of the movable core 53. In this case, it is effective to form a low-friction material layer of a fluorocarbon resin or the like on the outer peripheral surface of the movable core 53, in providing more stable smooth upward and downward movements of the movable core 53.

The set spring 57 comprises a coil spring, and is disposed concentrically with the connecting bolt 55 by fitting the spring over a larger-diameter portion 55a of a base of the connecting bolt 55. An annular spring seat 65 made of a steel plate for preventing the friction of the movable core 53 is interposed between the set spring 57 and the movable core 53. The spring seat 65 has inner and outer concentric positioning tubular portions 66 and 67 rising from its inner and outer peripheral edges along the inner and outer peripheral surfaces of the set spring 57. The outer positioning tubular portion 67 is formed longer than the inner positioning tubular portion 66. Funnels 66a and 67a are formed at upper ends of the positioning tubular portions 66 and 67 in order to facilitate the insertion of the set spring 57 into between the positioning tubular portions 66 and 67.

Figure 9:
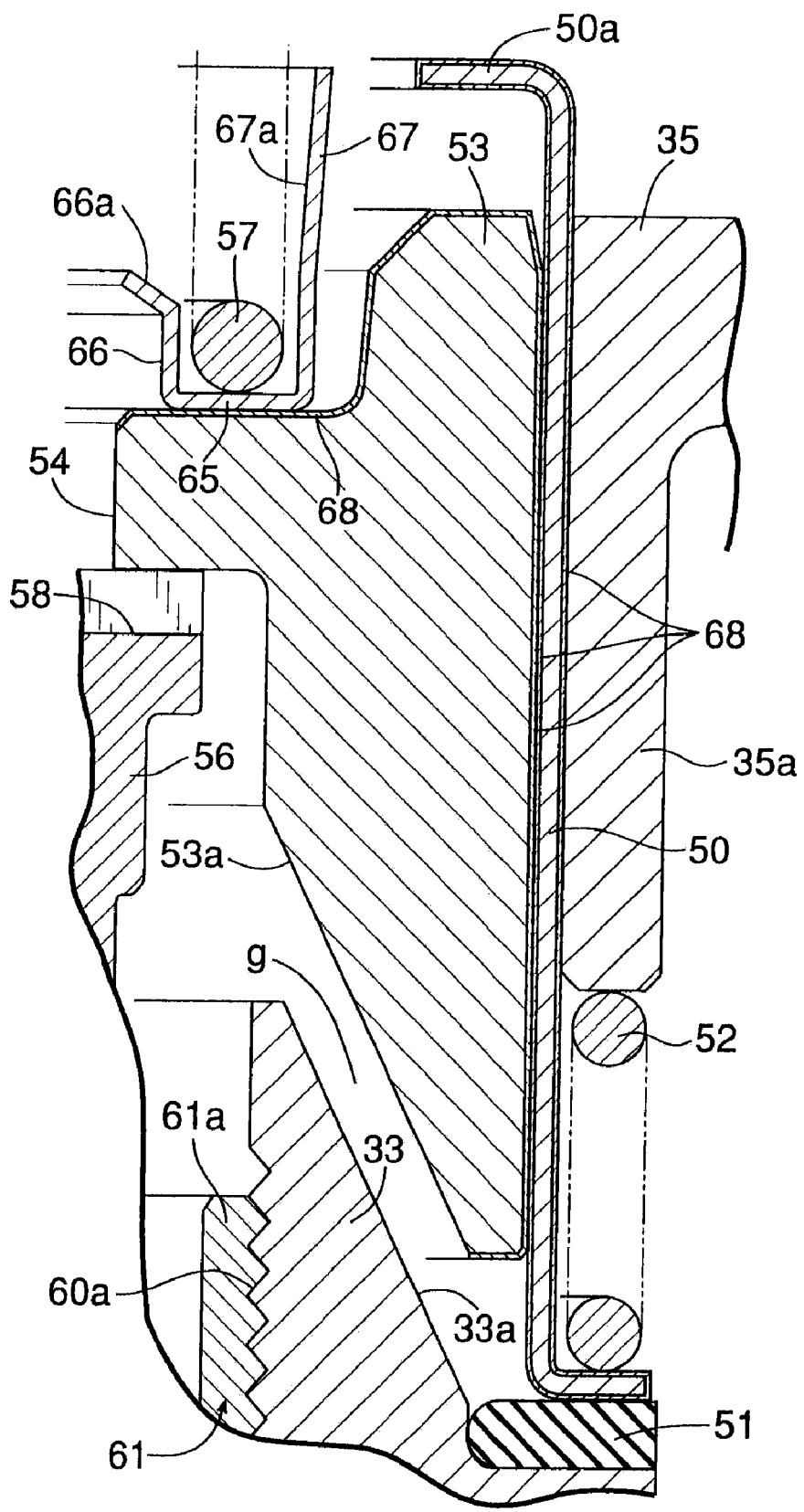
FIG. 9 is an enlarged view of a section 9 in FIG. 4.

As shown in FIG. 9, a low-friction material coating or coatings 68 and 68 made of a fluorocarbon resin is or are formed, for example, by spraying, on at least one or desirably both opposed sliding surfaces of the bearing member 50 and the movable core 53, i.e., the outer peripheral surface of the bearing member 50 and the outer peripheral surface of the movable core 53. In the illustrated embodiment, the low-friction material coatings 68 are formed on the entirety of inner and outer surfaces of the bearing member 50. Also, the low-friction material coating 68 is formed on the movable core 53 in its outer peripheral surface and its abutment face against the spring seat 65.

Referring again to FIG. 1, an electronic control unit U is connected to the coil 39 of the actuator 31 through the coupler 42, and receives detection signals inputted thereto from a rotational speed sensor Sa for detecting an engine rotational speed, a load sensor Sb for detecting a load inputted to the active vibration-isolating support system M, and an acceleration sensor Sc for detecting an acceleration applied to the engine E.

The operation of this embodiment will be described below.

When the actuator 31 of the active vibration-isolating support system M is in a non-operated state, the first and second liquid chambers 24 and 25 communicating with each other through the upper and lower orifices 26 and 27 are maintained under the same pressure. However, since the area of the first cap member 19 which is connected to the movable member 20 and receives the pressure in the first liquid chamber 24 is larger than the area of the first cap member 19 receiving the pressure in the second liquid chamber 25, a downward load obtained by multiplying a difference between the areas by the pressure in the first liquid chamber 24 is applied to the movable member 20. When the load is balanced with a resilient force of the second elastic member 18, the movable member 20 is stopped to form a predetermined initial air gap g between the attraction faces 33a and 53a of the stationary core 33 and the movable core 53.

When a shaking vibration of a low frequency occurs in the engine E during traveling of an automobile, the first elastic member 14 is deformed by a load inputted thereto from the engine E, resulting in a change in volume of the first liquid chamber 24. At this time, the flowing of a liquid occurs from one to the other between the first and second liquid chamber 24 and 25 communicating with each other through the upper and lower orifices 26 and 27. When the volume of the first liquid chamber 24 is increased or reduced, the volume of the second liquid chamber 25 is correspondingly increased or reduced, but the change in volume of the second liquid chamber 25 is absorbed by the elastic deformation of the diaphragm 22. In this case, the vibration transmitted from the engine E to the vehicle frame F can be reduced effectively, because the shapes and sizes of the upper and lower orifices 26 and 27 as well as the spring constant of the first elastic member 14 are set so that a high spring constant and a high damping force are exhibited in the frequency region of the shaking vibration.

In such a shaking vibration region of a low frequency in the engine E, the actuator 31 is retained in the non-operated state.

When a vibration of a frequency higher than that of the shaking vibration is generated in the engine E, i.e., an idling vibration during idling of the engine or a vibration with muffled-sound is generated, the liquid in the upper and lower orifices 26 and 27 connecting the first and second liquid chambers 24 and 25 to each other is brought into a stuck state, whereby a vibration-isolating function cannot be exhibited. At such a time, the actuator 31 is driven to exhibit a vibration-isolating function.

Namely, the electronic control unit U controls the supplying of electric current to the coil 39 of the actuator 31, based on the detection signals from the engine rotational speed sensor Sa, the load sensor Sb, the acceleration sensor Sc and the like. Specifically, when the engine E is displaced downwards by the vibration, and the volume of the first liquid chamber 24 is reduced by the downward deformation of the first elastic member 14, resulting in an increase in liquid pressure in the chamber 24, the coil 39 is excited to attract the movable core 53 toward the stationary core 33. As a result, the movable core 53 is moved downwards to increase the volume of the first liquid chamber 24, while deforming the second elastic member 18. Thus, an increase in pressure in the chamber 24 can be suppressed, and ultimately the active vibration-isolating support system M generates an active support force for preventing the transmission of the downward load from the engine E to the vehicle frame F.

By contrast, when the engine E is displaced upwards to increase the volume of the first liquid chamber 24 resulting in an increase in pressure in the chamber 24, the coil 39 is deexcited to release the movable core 53. As a result, the movable core 53 is moved upwards by means of a resilient force of the second elastic member 18 to reduce the volume of the first liquid chamber 24. Thus, a reduction in pressure in the chamber 24 can be suppressed, and ultimately the active vibration-isolating support system M generates an active support force for preventing the transmission of the upward load from the engine E to the vehicle frame F.

In the above-described operation, when the pressure in the first liquid chamber 24 is suddenly increased with an excessive increase in a downward load from the engine E to the first elastic member 14, so that an excessive downward load is applied to the movable member 20, the movable member 20 first causes the movable core 53 to move downwards to its downward movement limit, i.e., until the lower end face of the core 53 is brought into abutment against the elastic plate 51 on the thick inner peripheral portion 36b of the lower yoke 36. Thereafter, the set spring 57 is compressed to deform, and the adjusting nut 56 is separated from the lower surface of the movable core 53, thereby permitting the further movement of the movable member 20 toward the stationary core 33. Therefore, the excessive load applied to the movable member 20 can be absorbed by the set spring 57 to prevent the contact between the stationary core 33 and the movable core 53 and the application of the excessive load to the movable core 53 and the elastic member 51, thereby ensuring their durability.

If the downward movement of the movable member 20 reaches a predetermined amount after the movable core 53 reaches the downward movement limit, the adjusting nut 56 is put into abutment via the elastic plate 63 against the bottom 61c of the plug 61 secured to the stationary core 33, whereby an excessive increase in load of the set spring 57 can be suppressed, and an increase in excessive load applied to the stationary core 33 and the movable core 53 can be prevented.

Because the low-friction material coating 68 made of the fluorocarbon resin is formed on at least one of the opposed sliding surfaces of the bearing member 50 and the movable core 53, good sliding properties are provided to the bearing member 50 and the movable core 53, and the upward and downward movements of the movable core 53 as described above are smoothly conducted. Thus, it is possible to enhance the wear resistances of the bearing member 50 and the movable core 53 to accommodate an increase in output from the actuator 31.

Especially, when the low-friction material coatings 68 are formed on both the opposed sliding surfaces of the bearing member 50 and the movable core 53, as in the illustrated embodiment, it is possible to effectively suppress the wear of the low-friction material coatings 68 occurring in the initial stage of shakedown sliding between the bearing member 50 and the movable core 53 to further enhance their wear resistances. As a result of a wear resistance test actually carried out for a case where a low-friction material coating 68 has been formed on only one of the sliding surfaces and a case where low-friction material coatings 68 was confirmed that the former exhibits a wear resistance about 2.5 times that of the latter.

Further, when the low-friction material coatings 68 are formed on the entirety of inner and outer surfaces of the bearing member 50, as in the illustrated embodiment, it is possible to eliminate the need for masking the bearing member 50 during formation of the low-friction material coatings 68, thereby providing the simplification of the manufacturing process to contribute to a cost reduction. Moreover, the fitting of the bearing member 50 to the inner peripheral surface of the cylindrical portion 35a of the upper yoke 35 can be smoothly conducted by virtue of the low-friction material coating 69 also formed on the outer peripheral surface of the bearing member 50, thereby also contributing to an enhancement in assemblability.

The initial air gap g between the attraction faces 33a and 53a of the stationary core 33 and the movable core 53 in the non-operated state of the actuator 31 governs characteristics relating to the thrust and displacement of the movable member 20 in the active vibration-isolating support system. However, the gap g may sometimes be out of an acceptable range due to accumulated errors generated in the production of various portions ranging from the mounting portion of the second elastic member 18 to the movable core 53. In such a case, as described above, the initial air gap g can be adjusted appropriately and easily by advancing or retracting the position of the adjusting nut 56 threadedly fitted over the connecting bolt 55. Therefore, it is possible to provide a predetermined thrust and displacement to the movable member 20 with a high accuracy, thereby providing an enhancement in performance of the active vibration-isolating support system M.

By preparing a plurality of types of active vibration-isolating support systems M having different air gaps g each adjusted between the stationary core 33 and the movable core 53 by the operation of the adjusting nut 56, the active vibration-isolating support systems M having characteristics corresponding to a plurality of types of vehicles can be easily provided, leading to contribution to the cost reduction.

Moreover, the adjusting nut 56 is operated through the adjusting bore 60 provided in the stationary core 33 and opening to the outside of the housing 32. Therefore, after completion of the assembling of the active vibration-isolating support system M, the initial air gap g can be adjusted precisely, irrespective of errors in assembling of the various components.

The stationary core 33 is hollow, because it has the adjusting bore 60. However, the positioning shaft 33b integral with the stationary core 33 is press-fitted into the positioning bore 37 in the bottom wall 32b of the housing 32, and the flange-shaped lower yoke 36 is in close contact with the bottom 32b, whereby the stationary core 33 is reinforced strongly. Thus, even if the stationary core 33 receives an abutting shock from the movable core 53, it can sufficiently withstand the abutting shock, and also suffers no displacement. Moreover, the lower yoke 36 effectively increases a magnetic path around the coil assembly 34 by cooperation with the housing 32 and the upper yoke 35, and hence it is possible to provide an increase in attraction force between the stationary and movable cores 33 and 53.

On the other hand, an upward movement limit for the movable core 53 is defined by the abutment of the upper end of the movable core 53 against the inward-facing flange 50a of the bearing member 50. When the movable core 53 is brought strongly into abutment against the inward-facing flange 50a, a resulting shock force is transmitted through the bearing member 50 and the outward-facing flange 50b to the set spring 52, and absorbed by the resiliency of the set spring 52. Therefore, the set spring 52 also serves as a shock-absorbing member for protecting the movable core 53 and the bearing member 50 from the shock force.

The movable core 53 is retained resiliently on the adjusting nut 56 by the set spring 57, and moreover a sufficient play is provided between the inner surface of the through-hole 54 in the movable core 53 and the connecting bolt 55. Therefore, the movable core 53 and the connecting bolt 55 are capable of being oscillated relative to each other, and hence even when a load is applied to the movable member 20 in an inclining direction during operation of the active vibration-isolating support system, the inclination of the movable core 53 can be prevented by the oscillation of the connecting bolt 55, thereby maintaining a good sliding relationship between the movable core 53 and the bearing member 50. In this case, the set spring 57 is somewhat moved laterally with the oscillation of the connecting bolt 55, but the spring seat 65 is slid smoothly on the upper surface of the movable core 53 following the set spring 57, whereby the generation of wear powder from the movable core 53 can be suppressed effectively. This is because the spring seat 65 for retaining the lower end of the set spring 57 is interposed between the set spring 57 and the movable core 53, and moreover the low-friction material coating 68 is formed on the abutment face of the movable core 53 opposed to the spring seat 65 as well as on the inner peripheral surface of the movable core 53. Therefore, it is possible to prevent a trouble due to the wear powder, e.g., the obstruction of the movement of the movable core 53 due to the wear power entering the sliding portions of the bearing member 50 and the movable core 53.

The bearing member 50 is mounted in the predetermined position on the lower yoke 36 in an extremely simple structure in which the set spring 52 is mounted under compression between the outward-facing flange 50b at the lower end of the bearing member 50 and the upper yoke 35. Therefore, a high accuracy is not required for mounting of the bearing member 50, leading to a cost reduction. Moreover, the set spring 52 is disposed on the side of the outer periphery of the bearing member 50, and hence even if wear powder is generated between the set spring 52 and portion on which the set spring 52 is pressed, it is possible to prevent the wear powder from entering inside the bearing member 50. Especially, because the elastic plate 51 is interposed between the outward-facing flange 50b and the lower yoke 36 to come into close contact with them, it is possible to reliably prevent the wear powder from entering inside the bearing member 50 by the elastic plate 51, and thus, the bearing member 50 can exhibit a good guidance for the movable core 53 over a long period.

The resilient force of the set spring 52 is supported by the upper yoke 35 connected to the housing 32, and is not applied to the movable core 53. Therefore, it is possible to prevent a loss of an effective attraction force between the stationary and movable cores 33 and 53 due to the resilient force of the set spring 52, to thereby provide an enhancement in output performance of the movable core 53.

The coil cover 41 is formed on the coil assembly 34 to come into close contact with the outer peripheral surfaces of the coil 39 and the bobbin 38 so as to seal the coil 39 on the bobbin 38, and hence the water-proof property of the coil 39 can be enhanced. Moreover, the coupler 42 is integrally formed on the coil cover 41 to protrude radially outwards while retaining the coupler terminal 40, and hence either a lead wire connected to the coil 39 or a coupler holder for supporting the coupler is not required. Thus, it is possible to decrease the number of parts and the number of assembling steps to provide a cost reduction.

In addition, the bobbin 38 is integrally formed at its one end face with the small support pillar 38a, to which the base end of the coupler terminal 40 is insert-coupled; the lead wire 39a of the coil 39 connected to the coupler terminal 40 is wound around the small support pillar 38a; and thereafter, the projection 42a is integrally formed along with the coupler 42 on the coil cover 41 to protrude from the lower end face of the coil cover 41, to thereby enclose the small support shaft 38a and the lead wire 39a. Therefore, it is possible to conduct the formation of the coil cover 41, the coupler 42 and the projection 42a, while reliably preventing the looseness of the lead wire 39a by winding the lead wire 39a of the coil 39 around the small support shaft 38a.

Further, when the coupler 42 is exposed to the outside through the opening 43 provided in the region from the peripheral wall to the bottom wall 32b of the housing 32, it is unnecessary to provide a space for accommodation of the projection 42a in the housing 32, and the projection 42a cannot overhang over the outer surface of the housing 32, because the projection 42a is disposed in the opening 43 to adjoin the bottom wall 32b. Thus, it is possible to provide compactness of the actuator 31.

Although the embodiment of the present invention has been described in detail, the present invention is not limited to the above-described embodiment, and various modifications in design may be made without departing from the subject matter of the invention defined in the claims. For example, in the above-described embodiment, the movable member 20 and the connecting bolt 55 are formed separately and threadedly connected to each other for integration, but both the members 20 and 55 can be integrally formed by the same material. The fitted portions of the positioning shaft 33b of the stationary core 33 and the positioning bore 37 in the bottom wall 32b of the housing 32 can be fixed by welding, instead of the press-fitting.

What is claimed is:
1. An electromagnetic actuator comprising a magnetic circuit in which a movable core is driven by excitation of a coil, wherein the magnetic circuit comprises:
   a bottomed cylindrical housing supporting the coil; and
   an upper yoke provided in an upper open portion of the housing,
the actuator further comprises:
   a coil assembly constructed by winding the coil around a bobbin; and
   a coupler terminal to which a lead wire of the coil is connected,
wherein a coil cover is integrally and seamlessly formed with a coupler protruding radially outwards of the coil assembly and retaining the coupler terminal, and a projection protruding from an end face of the coil cover, said coil cover being formed by molding on outer peripheries of the coil and the bobbin so as to fix the coil to the bobbin in a sealed manner, and
the coupler is disposed at an opening defined in a peripheral wall of the housing located adjacent a radial outer periphery of the coil assembly, wherein the coupler is exposed through the opening and the projection is positioned adjacent to a bottom wall of the housing.

* * * * *